(12) United States Patent
Hodrus et al.

(10) Patent No.: US 12,449,007 B2
(45) Date of Patent: Oct. 21, 2025

(54) METHOD FOR CONTROLLING A HYDRAULIC CONTROL DEVICE

(71) Applicant: Schaeffler Technologies AG & Co. KG, Herzogenaurach (DE)

(72) Inventors: Erhard Hodrus, Achern (DE); Christian Eberle, Bühl (DE); Marian Preisner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/285,652

(22) PCT Filed: Mar. 17, 2022

(86) PCT No.: PCT/DE2022/100208
§ 371 (c)(1),
(2) Date: Oct. 5, 2023

(87) PCT Pub. No.: WO2022/214129
PCT Pub. Date: Oct. 13, 2022

(65) Prior Publication Data
US 2024/0209906 A1    Jun. 27, 2024

(30) Foreign Application Priority Data

Apr. 7, 2021   (DE) ..................... 10 2021 108 559.4

(51) Int. Cl.
*F16D 48/02* (2006.01)
(52) U.S. Cl.
CPC ...... *F16D 48/02* (2013.01); *F16D 2048/0221* (2013.01)

(58) Field of Classification Search
CPC ............. F16D 48/02; F16D 2048/0221; F16D 48/0206; F16D 2048/0227
See application file for complete search history.

(56) References Cited

U.S. PATENT DOCUMENTS

| | | | |
|---|---|---|---|
| 2016/0025211 A1* | 1/2016 | Schaefer | ................. F16H 61/12 701/58 |
| 2016/0363215 A1* | 12/2016 | Köhler | .................. F16D 48/066 |
| 2019/0390722 A1* | 12/2019 | Ruiters | ................... F16D 48/06 |

FOREIGN PATENT DOCUMENTS

| DE | 102005034526 A1 | 3/2006 |
|---|---|---|
| DE | 102007056175 A1 | 5/2009 |
| DE | 102017111966 A1 | 12/2018 |

(Continued)

*Primary Examiner* — Tisha D Lewis
(74) *Attorney, Agent, or Firm* — Price Heneveld LLP

(57) ABSTRACT

A method is provided for controlling a hydraulic control device which can actuate a torque device and includes a first actuating element configured to be acted upon by a first fluid pressure in a first fluid line and configured to actuate the torque device; a system pressure line hydraulically connected to the first fluid line and having a system pressure; a first valve element located between the first fluid line and the system pressure line and configured to the first fluid pressure via the system pressure; and a supply element configured to provide the system pressure and being hydraulically connected to the system pressure line. The method includes setting first fluid pressure based on a predetermined target torque value, and setting the system pressure above the first fluid pressure by a pressure difference based on a pressure control value.

17 Claims, 4 Drawing Sheets

(56) References Cited

FOREIGN PATENT DOCUMENTS

| | | | |
|---|---|---|---|
| DE | 102019130158 A | 11/2019 | |
| DE | 102018131758 A1 | 6/2020 | |
| DE | 102019123965 A1 | 3/2021 | |
| DE | 102020124112 B3 | 2/2022 | |
| DE | 102021121012 A1 | 11/2022 | |
| EP | 1898113 A2 * | 3/2008 | ........... F16D 48/066 |
| JP | S60183232 A | 9/1985 | |
| WO | 2021069021 A1 | 4/2021 | |

* cited by examiner

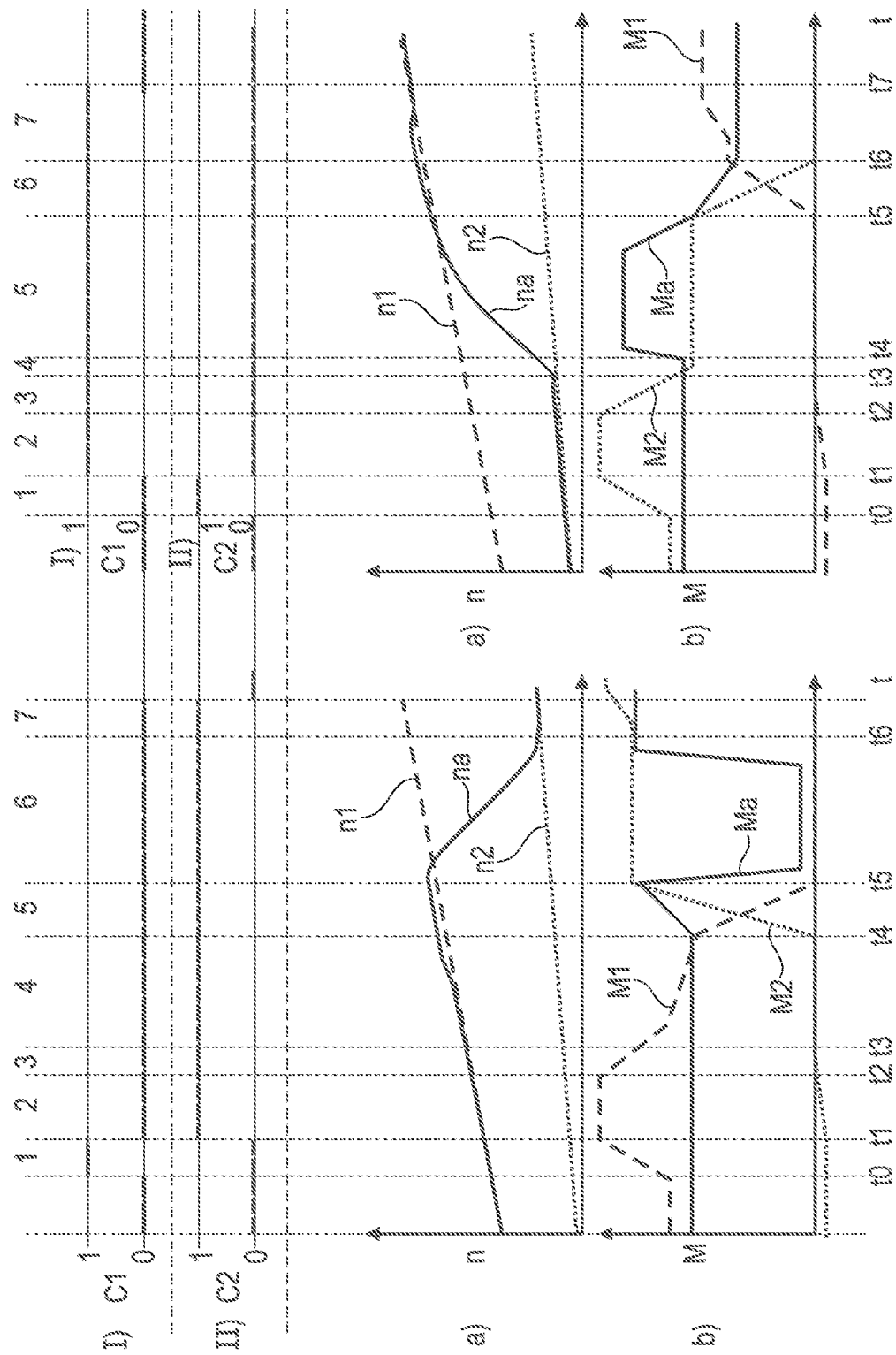

METHOD FOR CONTROLLING A HYDRAULIC CONTROL DEVICE

CROSS-REFERENCE TO RELATED APPLICATIONS

This application is the U.S. National Phase of PCT Appln. No. PCT/DE2022/100208 filed Mar. 17, 2022, which claims priority to DE 102021108559.4 filed Apr. 7, 2021, the entire disclosures of which are incorporated by reference herein.

TECHNICAL FIELD

The present disclosure relates to a method for controlling a hydraulic device that can actuate a torque device.

BACKGROUND

A method for controlling a hydraulic device for a torque device is described, for example, in DE 10 2019 130 158.0. The torque device is designed as a dual clutch and comprises a first and second clutch, each of which can be actuated via fluid pressure and are hydraulically connected to a system pressure line. The actuation of the respective clutch is controlled by a clutch valve assigned to the individual clutch depending on a system pressure provided by a pump in the system pressure line.

SUMMARY

The present disclosure provides a method, according to an exemplary embodiment, to control a torque device more accurately and in a more energy-efficient manner. The control device can be constructed in a more cost-effective, space-saving and efficient manner. The control of the control device can be improved.

The torque device can be arranged in a drive train of a vehicle, in particular of a motor vehicle. The torque device can have a clutch and/or a brake. The clutch can be a multiple clutch, in particular a dual clutch. The dual clutch can have a first clutch and a second clutch. The first and second clutches can be independently actuatable. The torque device can bring about frictional torque transmission between a drive element, for example, an internal combustion engine and/or an electric motor, and an output element, for example, a transmission.

The torque device can have a cooling device for cooling the torque device, in particular the first and/or second clutch, having a cooling fluid. The cooling device can also be effective for cooling other components, for example, an electric motor. The cooling device can be supplied by the system pressure.

The supply element can have a pump. The pump can be operated by an electric motor. The electric motor can be operated independently of a rotational speed of the torque device. This allows a sufficient pump rotational speed to be applied. The pump can optionally be operated in a first direction of rotation and a second, opposite direction of rotation. In a first direction of rotation, the pump can provide a maximum system pressure and a maximum volumetric flow, and in the second direction of rotation, a lower maximum system pressure and a higher maximum volumetric flow.

A first check valve can be positioned between a first valve element and a system pressure line and maintain a first fluid pressure which is higher than the system pressure. As a result, the system pressure in the system pressure line can be lowered below the first fluid pressure when the first fluid pressure is set. The actuation of the first actuation element can be carried out in a more energy-saving manner. The system pressure can also be used for at least one further application, for example, for cooling the torque device.

A pressure control value enables the system pressure to be controlled with respect to the first fluid pressure, for example, to increase the first fluid pressure even if the target torque value does not require this, in order to establish a hydraulic capacity across a first actuating element which maintains the first fluid pressure above a pressure value of the minimum required first fluid pressure set by the target torque value even in the presence of fluid leaks reducing the first fluid pressure. The pressure accumulator formed by the hydraulic capacity may be filled with the pressure control value via the control when the need for high system pressure is reduced.

In embodiments of the present disclosure, the system pressure can be set at a first value of the pressure control value above the first fluid pressure by the predetermined pressure difference and at a second value of the pressure control value different from the first value, independently of the predetermined pressure difference. The first value can be one and the second value can be zero.

The system pressure can be set above the first fluid pressure by a predetermined pressure difference as long as the pressure control value has a predetermined value. If the pressure control value is changed to a different value, the system pressure can be set independently of the predetermined pressure difference.

In embodiments of the present disclosure, the pressure control value can assume at least two values. The pressure control value can be a binary value. The pressure control value can assume more than two values.

In embodiments of the present disclosure, the system pressure can be set on the one hand via the target torque value and on the other hand via the pressure control value, in each case depending on the first fluid pressure. The system pressure can be set via the target torque value at least to a pressure value that corresponds to a first fluid pressure corresponding to the target torque value. Additionally, the system pressure can be set above the first fluid pressure by the predetermined pressure difference via the pressure control value. As a result, the hydraulic capacity can be used as a pressure accumulator in order to be able to keep the first fluid pressure stable despite the occurrence of fluid leakage and to implement the increase in the system pressure as infrequently as possible.

Embodiments of the present disclosure have the advantage that the predetermined pressure difference is predetermined as a constant value and/or is dependent on the first fluid pressure. The predetermined pressure difference can be a function of the first fluid pressure. The function can be a linear or non-linear function.

Embodiments of the present disclosure have the advantage that the torque device has a second actuating element which can be acted upon by a second fluid pressure in a second fluid line and can actuate the torque device, and a second valve element which is located between the second fluid line and the system pressure line and which sets the second fluid pressure depending on the system pressure, wherein the first fluid pressure is set depending on the target torque value as the first target torque value and the second fluid pressure is set depending on a second target torque value and the system pressure is set depending on the pressure control value as the first pressure control value by the predetermined pressure difference as the first predetermined pressure difference above the first fluid pressure and depending on a second pressure control value is set by a second predetermined pressure difference above the second fluid pressure. A second check valve can be arranged between the second valve element and the system pressure line and maintain a second fluid pressure which is higher than the system pressure. As a result, the system pressure in the system pressure line can be lowered below the second fluid pressure when the second fluid pressure is set. The actuation of the second actuation element can be carried out in a more energy-saving manner. The system pressure can also be used for at least one further application, for example, for cooling the torque device.

In embodiments of the present disclosure, it is provided that the first pressure control value and the second pressure control value can be set independently of one another. The first and second pressure control values can have the same value at the same time.

In embodiments of the present disclosure, it is provided that the first pressure difference is predetermined to be the same as or different from the second pressure difference. The first pressure difference can have a binary value and the second pressure difference can have multiple values, or vice versa. The first and second pressure difference can also have the same number of possible values.

In embodiments of the present disclosure, the system pressure can be simultaneously set to the higher of the two pressure values via the first and second pressure control values, the first pressure difference to be set above first fluid pressure on the one hand and the second pressure difference to be set above the second fluid pressure on the other hand. As a result, the supply of system pressure can be ensured for both the first and the second actuating element.

In embodiments of the present disclosure, it is provided that the torque device is designed as a dual clutch, which has a first clutch which can be actuated via the first actuating element, and a second clutch which can be actuated via the second actuating element. The first and second clutches are independently operable via the first and second fluid pressures, respectively.

Further advantages and advantageous embodiments of the present disclosure result from the description of the figures and the drawings.

BRIEF DESCRIPTION OF THE DRAWINGS

The present disclosure is described in detail below with reference to the drawings. Specifically:

FIG. 2: shows an influence of controlling the system pressure via the pressure control value in an upshift.

FIG. 3: shows an influence of controlling the system pressure via the pressure control value in a downshift.

DETAILED DESCRIPTION

Figure 1:
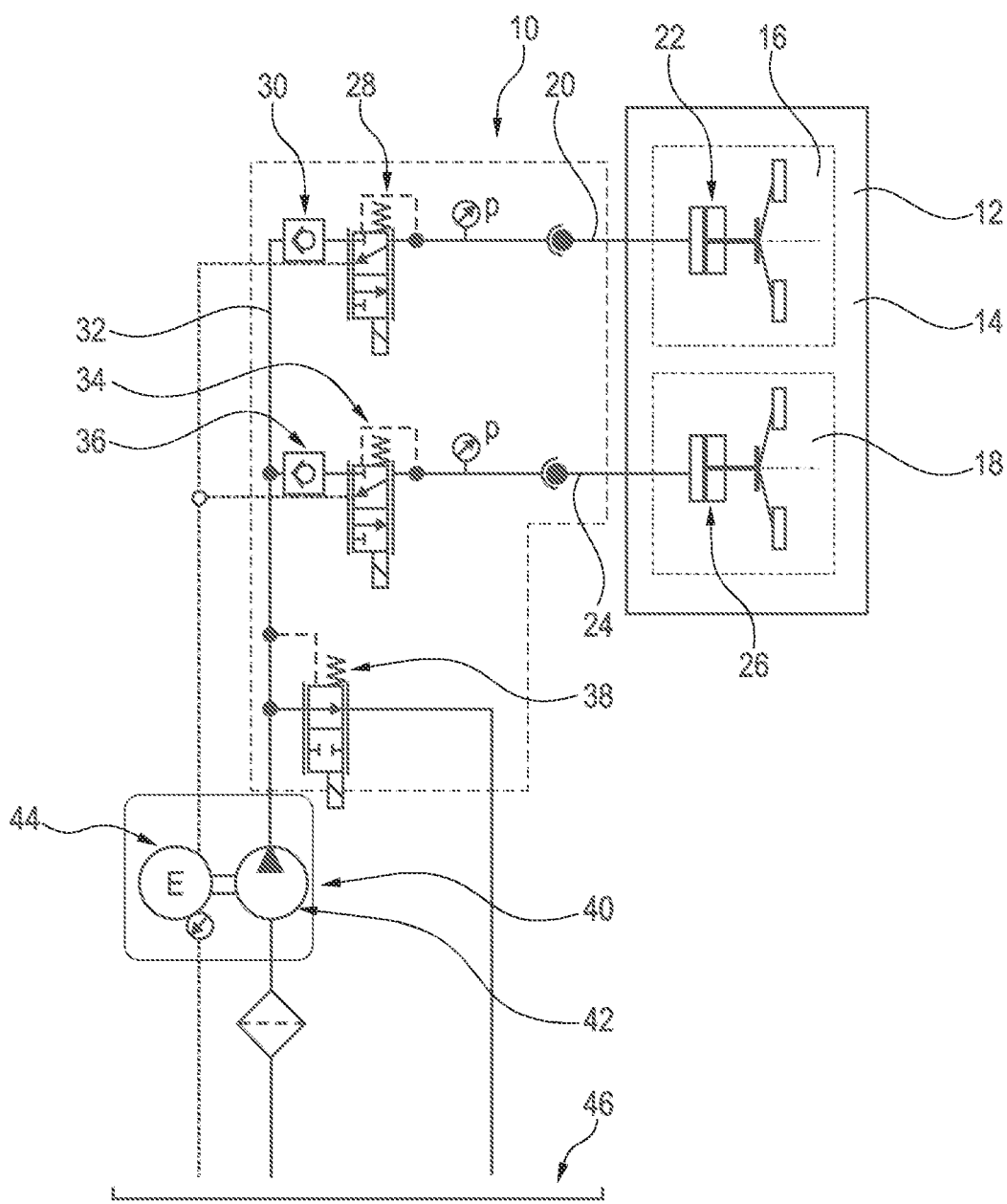
FIG. 1: shows a hydraulic control device in an exemplary embodiment of the present disclosure.

FIG. 1 shows a hydraulic control device 10 in an exemplary embodiment of the present disclosure. The hydraulic control device 10 is arranged in a vehicle for actuating a torque device 12, here in particular a dual clutch 14 having a first clutch 16 and a second clutch 18. The torque device 12 is connected to a drive element, in particular to an internal combustion engine, and makes a drive torque output from the internal combustion engine available on the output side depending on an actuation of the dual clutch 14.

The hydraulic control device 10 comprises a first actuating element 22, which can be acted upon by a first fluid pressure in a first fluid line 20 and actuates the first clutch 16, and a second actuating element 26, which can be acted upon by a second fluid pressure in a second fluid line 24 and actuates the second clutch 18. The first and second fluid line 20, 24 are arranged in parallel. The first fluid line 20 is hydraulically connected to a system pressure line 32 via a first valve element 28 and a first check valve 30, and the second fluid line 24 is hydraulically connected to the system pressure line 32 via a second valve element 34 and a second check valve 36.

A system pressure in the system pressure line 32 is set via a system pressure valve 38 and made available by a supply element 40. The supply element 40 includes a pump 42 which is driven by an electric motor 44. The pump 42 and a return line of the system pressure valve 38 are connected to a fluid accumulator 46.

The first fluid pressure in the first fluid line 20 can be set via the first valve element 28, and the second fluid pressure in the second fluid line 24 can be set via the second valve element 34. The first and second fluid pressures are each built up by the system pressure. The first fluid pressure is set depending on a first target torque value for the first actuating element 22, and the second fluid pressure is set depending on a second target torque value for the second actuating element 26.

The first check valve 30 can maintain a first fluid pressure that is higher than the system pressure, and the second check valve 36 can maintain a second fluid pressure that is higher than the system pressure, even if the system pressure in the system pressure line 32 is lowered below the first or second fluid pressure when the first or second fluid pressure is set. In this case, the system pressure can be used for at least one further application, for example, for cooling the torque device 12.

FIG. 2 shows an influence of controlling the system pressure via a pressure control value during an upshift. A time profile of the rotational speed n is shown in FIG. 2a) and a time profile of the torque M is shown in FIG. 2b). The torque Ma of the drive element is transmitted via the actuated, and thereby closed, first clutch 16 up to time t4. The first clutch 16 is actuated by a first fluid pressure up to time t4, and an input speed na of the drive element is equal to the output speed n1 of the first clutch 16. The torque that can be transmitted as the first clutch torque M1 via the first clutch 16 depends on the first fluid pressure. The second clutch torque M2 of the second clutch 18 is below the torque Ma of the drive element as the second clutch 18 is open. Accordingly, the output speed n2 of the second clutch 18 is lower than the speed na of the drive element.

Beginning at time t4, the first clutch torque M1 decreases and the second clutch torque M2 simultaneously increases, and the upshift process is completed with a closed second clutch 18 and an open first clutch 16 from time t6, from which the speed na of the drive element corresponds to the output speed n2 of the second clutch 18.

FIG. 2I) shows the time profile associated with the time profile of the torque M and the speed n of a first pressure control value C1 which sets the system pressure via a predetermined first pressure difference above the first fluid pressure, and FIG. 2 II) shows the time profile associated with the time profile of the torque M and speed n of a second pressure control value C2 which sets the system pressure via a predetermined second pressure difference above the second fluid pressure. The first and second pressure control values C1, C2 are each a binary value that can assume zero and one. The first and second pressure control values C1, C2 are equal to zero before time t0. From time t0 to t1, the first pressure control value C1 is set to one, as a result of which the system pressure and the first fluid pressure and thus the first clutch torque M1 increase. The first check valve 30 prevents the first fluid pressure from decreasing, but fluid leakage in the first clutch 16 slowly decreases the first fluid pressure.

The second pressure control value is set to one from time t1 to t7, with which the second clutch 18 is supplied with the system pressure, since an increase in the second fluid pressure is pending when the second clutch 18 is closed.

FIG. 3 shows an influence of controlling the system pressure via the pressure control value during a downshift. The diagram in FIG. 3a) shows the speed n over time and in FIG. 3b) the torque M over time. FIG. 3I) shows the time profile of the first pressure control value C1 and FIG. 3 II) shows the time profile of the second pressure control value C2. In contrast to FIG. 2, a downshift is shown here. The first clutch 16 is initially open and the second clutch 18 is closed and transmits the torque Ma of the drive element.

The second pressure control value C2 is at one between the time t0 and t1, thereby increasing the system pressure and this increasing the second fluid pressure, whereby the second clutch torque M2 increases. The first pressure control value C1 is at one between the time t1 and t7, with which the first clutch 16 is supplied with the system pressure, since an increase in the first fluid pressure is pending when the first clutch 16 is closed. The first clutch torque M1 increases slowly from time t1 due to the system pressure.

Figure 4:
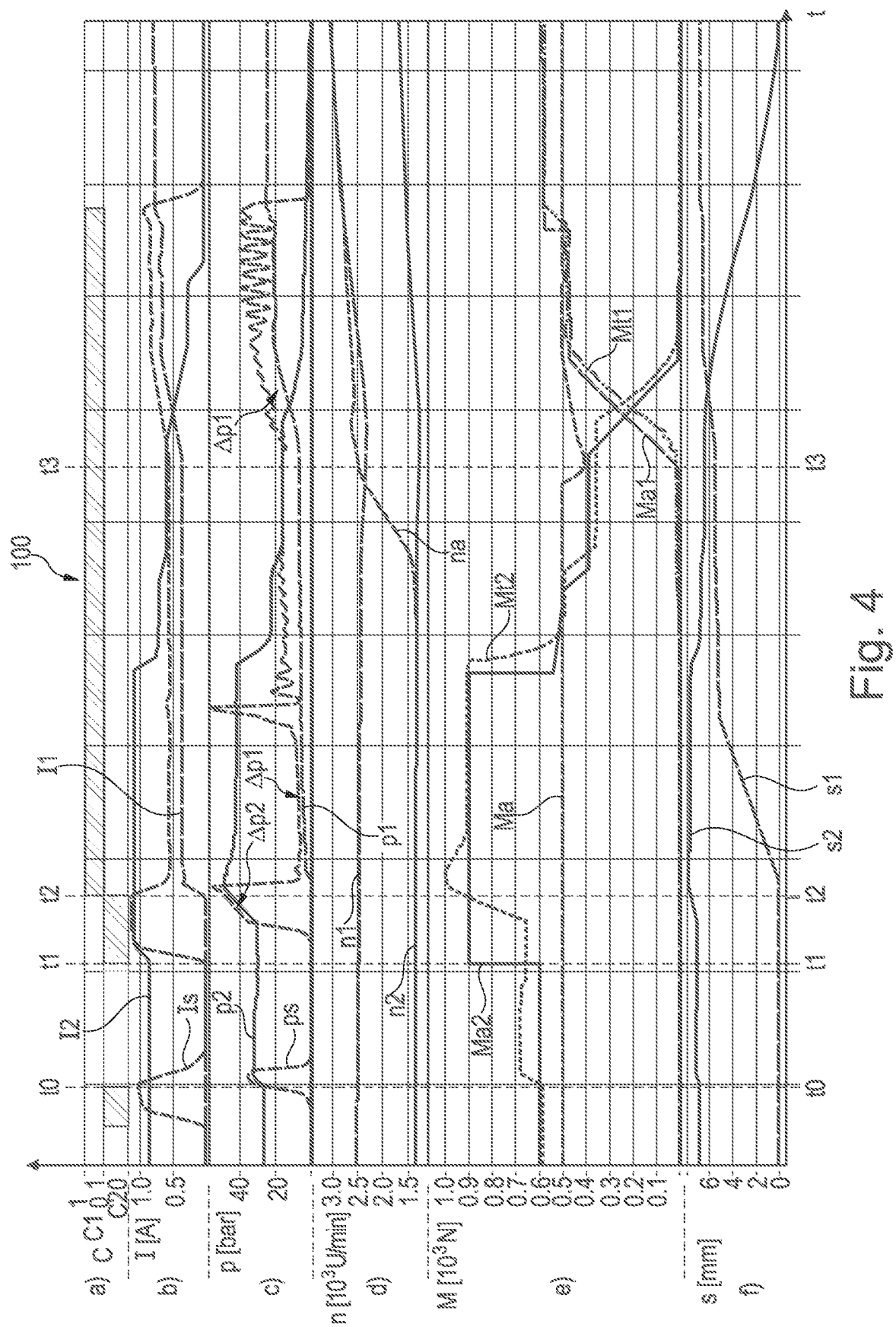
FIG. 4: shows a diagram in which a method for controlling the hydraulic control device in the exemplary embodiment of the present disclosure is carried out in a downshift.

FIG. 4 shows a diagram of a method for controlling the hydraulic control device in the exemplary embodiment of the present disclosure during a downshift. FIG. 4a) shows the time profile of the first pressure control value C1 and the second pressure control value C2; FIG. 4b) shows the time profile of the electric current Is for valve actuation of the system pressure valve 38, the electric current I1 for valve actuation of the first valve element 28 and the electric current I2 for valve actuation of the second valve element 38; FIG. 4c) shows the time profile of the system pressure ps, the first fluid pressure p1 and the second fluid pressure p2; FIG. 4d) shows the time profile of the speed na of the drive element, the time profile of the output speed n1 of the first clutch 16 and the time profile of the output speed n2 of the second clutch 18; FIG. 4e) shows the time profile of the torque Ma of the drive element, the time profile of the first clutch target torque Ma1 as the first torque target value, the time profile of the actual first clutch torque Mt1, the time profile of the second target clutch torque Ma2 as the second target torque value and the time profile of the actual second clutch torque Mt2, and FIG. 4f) shows the actuation path s1 of the first actuating element 22 and the actuation path s2 of the second actuating element 26.

A method 100 for controlling the hydraulic control device in the exemplary embodiment of the present disclosure is to be explained in the time window shown here from a downshift process under full load. First, the second clutch 18 is closed and the first clutch 16 is open. The method 100 controls the control device in such a way that the first clutch 16 is closed and the second clutch 18 is opened. At time t1, the second clutch 18 is fully closed by requesting a maximum second target clutch torque Ma2. The system pressure ps has a predetermined first pressure difference because of the second pressure control value C2 set to one $\Delta p2$ maintained above the second fluid pressure p2 until time t2.

From time t2, the first pressure control value C1 is set to one and the system pressure ps is increased by a predetermined first pressure difference $\Delta p1$ above the first fluid pressure p1. Between time t and time t1, both the first pressure control value C1 and the second pressure control value C2 are at zero. The system pressure ps is thus independent of a predetermined pressure difference, in particular independent of the first and second pressure difference $\Delta p1$, $\Delta p2$.

At time t3, the first target clutch torque Ma1 is increased. This also increases the first fluid pressure p1, and since the first pressure control value C1 is set to one, the system pressure ps increases by the predetermined first pressure difference $\Delta p1$. The value of the first pressure difference $\Delta p1$ can be dependent on the first fluid pressure p1, recognizable here by the larger value of the first pressure difference $\Delta p1$ from time t3 compared to the value of the first pressure difference $\Delta p1$ shortly after time t2.

Figure 5:
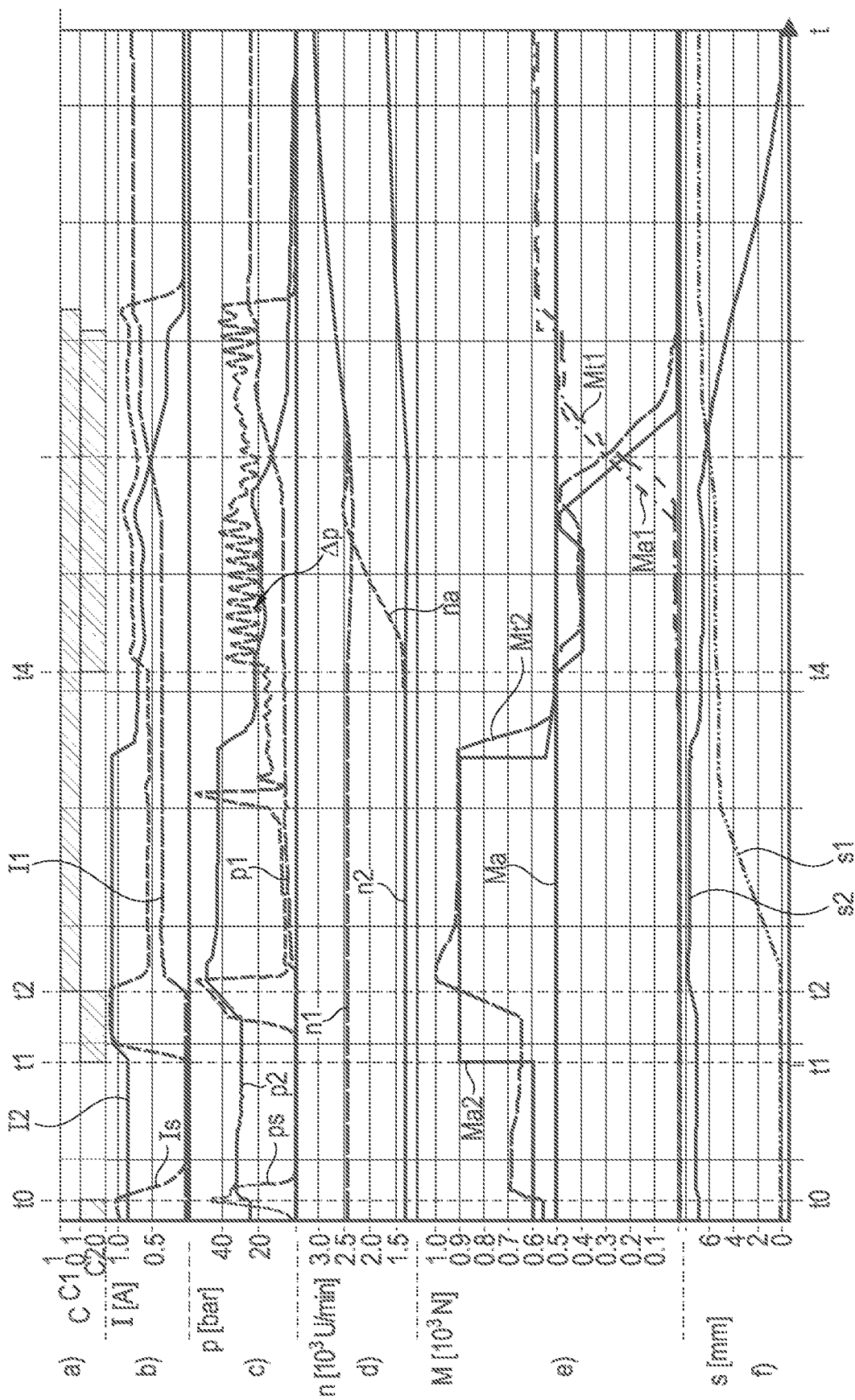
FIG. 5: shows a diagram in which a method for controlling the hydraulic control device in another embodiment of the present disclosure is carried out in a downshift.

FIG. 5 shows a diagram of a method for controlling the hydraulic control device in a further exemplary embodiment of the present disclosure during a downshift. The diagram is similar to that from FIG. 4, the description of which is hereby referred to. In contrast to FIG. 4, the second pressure control value C2 is set to one from time t4. Thus, from time t4, the first and second pressure control values C1, C2 are at one and the system pressure ps is around a pressure difference $\Delta p$ set above the higher of the two pressure values, here the second fluid pressure p2.

As a result, the second clutch 18 is prepared for closing, since the system pressure ps is increased by the pressure difference $\Delta p$ above the required second fluid pressure, and so that the second clutch 18 can be supplied with sufficient volume flow at all times.

LIST OF REFERENCE SIGNS

10 Control device
12 Torque device
14 Dual clutch
16 First clutch
18 Second clutch
20 First fluid line
22 First actuating element
24 Second fluid line
26 Second actuating element
28 First valve element
30 First check valve
32 System pressure line
34 Second valve element
36 Second check valve
38 System pressure valve
40 Supply element
42 Pump
44 Electric motor
46 Fluid accumulator
100 Method

The invention claimed is:

1. A method for controlling a hydraulic control device that can actuate a torque device, wherein the hydraulic control device includes a first actuating element configured to be acted upon by a first fluid pressure in a first fluid line and configured to actuate the torque device, a system pressure line hydraulically connected to the first fluid line and having a system pressure, a first valve element located between the first fluid line and the system pressure line and configured to set the first fluid pressure via the system pressure, and a supply element hydraulically connected to the system pressure line and configured to provide the system pressure, the method comprising:

setting the first fluid pressure based on a target torque value for the first actuating element, and setting the system pressure above the first fluid pressure by a pressure difference based on a pressure control value, wherein the system pressure is set, at a first value of the pressure control value above the first fluid pressure by the pressure difference, and, at a second value of the pressure control value different from the first value, independently of the pressure difference.

2. The method according to claim 1, wherein the pressure control value can assume at least two values.

3. The method according to claim 1, wherein the system pressure is set based on the target torque value and based on the pressure control value, in each case depending on the first fluid pressure.

4. The method according to claim 1, wherein the pressure difference is one of predetermined as a constant value or is dependent on the first fluid pressure.

5. The method according to claim 1, wherein the hydraulic control device has a second actuating element configured to be acted upon by a second fluid pressure in a second fluid line and configured to actuate the torque device, and a second valve element located between the second fluid line and the system pressure line and configured to set the second fluid pressure based on the system pressure, wherein the first fluid pressure is set based on the target torque value, the second fluid pressure is set based on a further target torque value, and the system pressure is set one of a) above the first fluid pressure by the pressure difference based on the pressure control value, or b) above the second fluid pressure by a further pressure difference based on a further pressure control value.

6. The method according to claim 5, wherein the pressure control value and the further pressure control value can be set independently of one another.

7. The method according to claim 5, wherein the pressure difference is predetermined as different from the further pressure difference.

8. The method according to claim 5, wherein the system pressure is simultaneously set to the higher of the first fluid pressure and the further fluid pressure, the pressure difference being set above the first fluid pressure, and the further pressure difference being set above the further fluid pressure.

9. The method according to claim 5, wherein the torque device is designed as a dual clutch, which has a first clutch, which can be actuated via the first actuating element, and a second clutch, which can be actuated via the second actuating element.

10. A method for controlling a hydraulic control device that can actuate a torque device, comprising:

determining a target torque value for an actuating element configured to actuate the torque device;

determining a first fluid pressure based on the target torque value, wherein the actuating element is configured to be acted upon by the first fluid pressure via a first fluid line;

setting a system pressure based on a pressure control value; and actuating a supply element to provide the system pressure to a system pressure line hydraulically connected to the first fluid line, wherein a first valve element is located between the first fluid line and the system pressure line and is configured to provide the first fluid pressure to the first fluid line based on the system pressure, wherein the pressure control value can assume at least two values, wherein, for a first value of the pressure control value, the system pressure is set above the first fluid pressure by a pressure difference, and for a second value of the pressure control value, the system pressure is set independently of the pressure difference.

11. The method according to claim 10, further comprising:

determining a further target torque value for a further actuating element configured to actuate the torque device;

determining a second fluid pressure based on the further target torque value, wherein the further actuating element is configured to be acted upon by the second fluid pressure via a second fluid line;

setting the system pressure based further on the higher of the first fluid pressure and the second fluid pressure; and actuating the supply element to provide the system pressure to the system pressure line, wherein the system pressure line is further hydraulically connected to the second fluid line, and a second valve element is located between the second fluid line and the system pressure line and is configured to provide the second fluid pressure to the second fluid line based on the system pressure.

12. The method according to claim 11, wherein:

when the first fluid pressure is greater than the second fluid pressure, the system pressure is set above the first fluid pressure by a pressure difference based on the pressure control value; and when the second fluid pressure is greater than the first fluid pressure, the system pressure is set above the second fluid pressure by a further pressure difference based on a further pressure control value.

13. The method according to claim 12, wherein the pressure control value and the further pressure control value are set independently of each other.

14. The method according to claim 12, wherein the pressure difference differs from the further pressure difference.

15. The method according to claim 11, wherein the torque device includes a first clutch configured to be actuated by the actuating element, and a second clutch configured to be actuated by the further actuating element.

16. The method according to claim 10, wherein the pressure difference is one of predetermined as a constant value or is dependent on the first fluid pressure.

17. The method according to claim 10, further comprising setting the system pressure based further on the target torque value, wherein each of the target torque value and the pressure control value are determined based on the first fluid pressure.

* * * * *